Dec. 21, 1937.   W. P. WHITE   2,103,051
PACKAGE SEALING APPARATUS
Original Filed Feb. 2, 1933
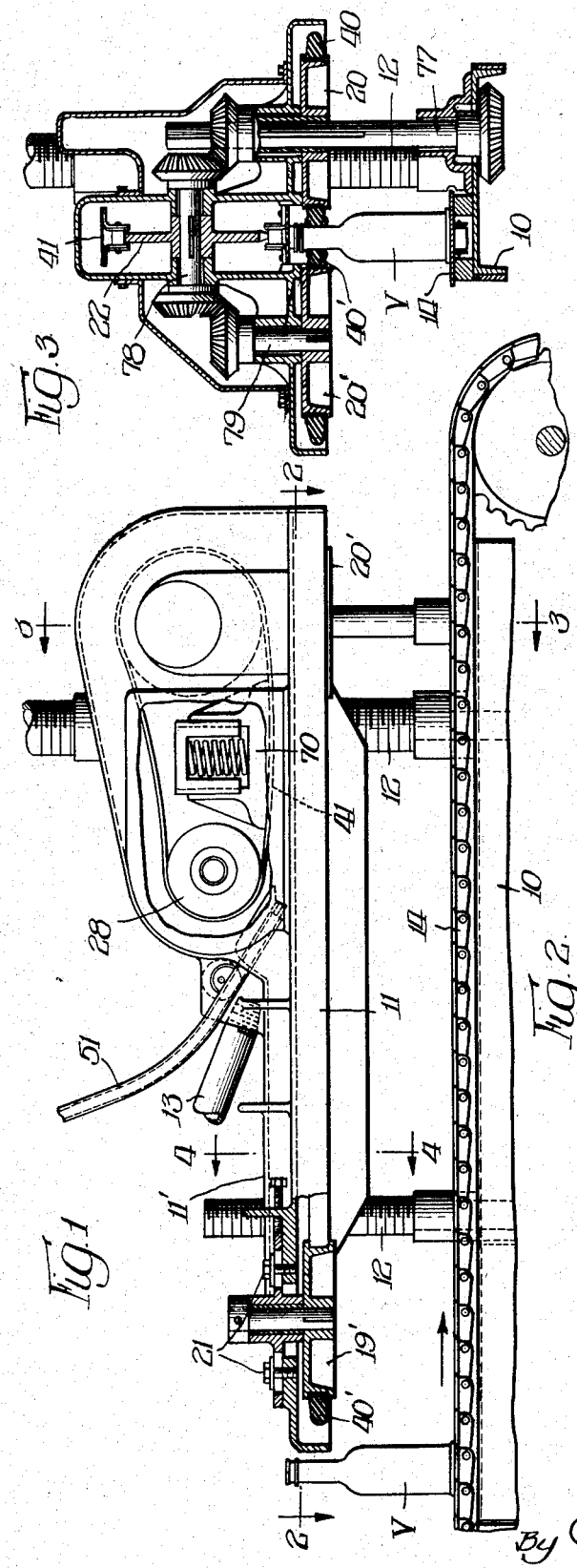
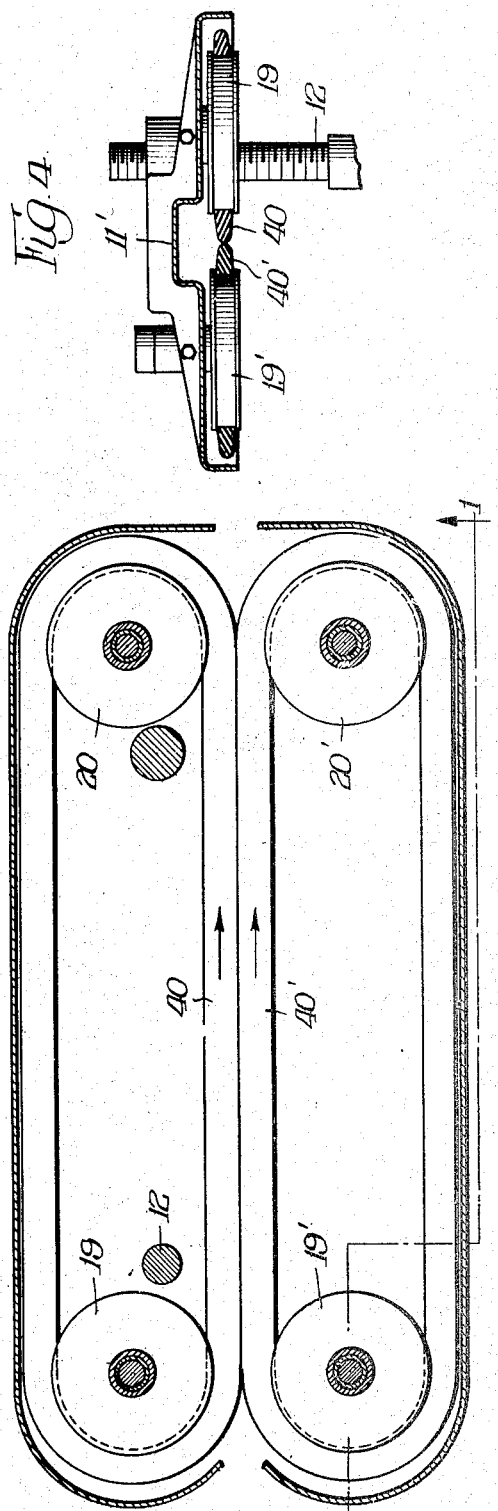
Inventor:
William P. White Patented Dec. 21, 1937

2,103,051

UNITED STATES PATENT OFFICE 2,103,051

PACKAGE SEALING APPARATUS

William P. White, Glencoe, Ill., assignor to White Cap Company, Chicago, Ill., a corporation of Delaware Original application February 2, 1933, Serial No. 654,847. Divided and this application July 5, 1935, Serial No. 29,806

10 Claims. (Cl. 226—80)

This invention relates to packaging and pertains particularly to apparatus for the sealing of closure caps on packing vessels such as bottles and the like. The present application is a division from my copending application Serial No. 654,847, filed February 2, 1933, on which U. S. Letters Patent No. 2,041,891 were issued on May 26, 1936.

General objects of the invention include the provision of an improved apparatus for applying and sealing closure caps on packing containers, whereby the capping may be accomplished incident to the continuous progressive movement of the containers at a high rate of speed and in close succession one after another, without subjecting the containers to likelihood of being overturned or tilted in such fashion as to spill any of their contents.

Another object is the provision of apparatus effective to obtain the above specified results and advantages, and in conjunction therewith to effect the sterilization of the closures and the mouth portions of the containers and to effect the displacement or removal of air from the unoccupied portions of the container and closure in such fashion that a sub-atmospheric pressure is obtained in the sealed packages.

Other and further objects will be pointed out or indicated hereinafter or will become apparent to one skilled in the art upon an understanding of the invention or its employment in use.

For the purpose of aiding in an explanation of the invention, I show in the drawing forming a part of this specification, and hereinafter describe, certain forms of apparatus embodying same. It is to be understood, however, that these are presented merely by way of example, and are not to be construed in any fashion calculated to limit the appended claims short of the true and most comprehensive scope of the invention in the art.

In said drawing,

Fig. 1 is a side elevational view, partly in section, of a form of sealing apparatus embodying the invention;

Fig. 2 is a part horizontal section on approximately line 2—2 of Fig. 1;

Fig. 3 is a transverse section on approximately line 3—3 of Fig. 1; and

Fig. 4 is a transverse section on approximately line 4—4 of Fig. 1.

Described generally, the invention contemplates apparatus whereby the filled containers are transmitted progressively, in a series, at a continuous uniform rate of speed, and closure caps are applied to and sealed upon the successive containers while they are thus moving progressively. The arrangement is such that the serially arranged containers do not have to be spaced uniformly from one another, nor does their progressive movement have to be timed with respect to the closure-applying and sealing operations. Preliminary to and during the application of the closure cap to a container, the open mouth of the container is moved through an atmosphere of hot condensable vapor, and the closure cap is maintained in the hot condensable vapor for the purpose of sterilizing the closure cap and the mouth portions of the container and displacing air from within them. The closure cap is sealed on the container promptly after its application thereto, with the result that in the sealed container the head space is occupied by hot condensable vapor. Consequently, upon the cooling of the sealed container and the confined vapor, the pressure within the sealed container will be below that of the atmosphere.

For the purpose of maintaining the containers in upright position incident to the application of the caps to them I provide belts which travel alongside the path of the containers, said belts being relatively thin or shallow and being elastically compressible, and arranged to engage the upper portions of the containers between them, so as to hold the containers securely against overturning. The arrangement of these belts furthermore is such as to afford a closure or movable bottom wall for a housing in which the mouth portions of the containers travel and within which the closure caps are applied to the containers, said housing forming a tunnel-like chamber for confining the atmosphere of hot vapor.

The invention will be understood in more detail by reference to the embodiment illustrated in the drawing. This includes a supporting frame 10 upon which a housing 11 is mounted for vertical adjustment by means of screw posts 12. Upon the frame travels an endless conveyor 14, which forms a moving table on which the containers, indicated at V, may stand. Over the conveyor the housing is shaped to form a tunnel or hood portion 11', into which hot steam is conveyed through a suitable pipe 13. A cap chute 51 leads into this tunnel, through the top, and constitutes a means for conducting and guiding closure caps in succession into the housing above the conveyor. The lower end of this chute is equipped with suitable detent means, which may be of the form illustrated and described in my copending application above identified, said detent means being adapted to retain the lowermost cap in the chute against falling out, but permitting withdrawal of the lowermost cap by the container as hereinafter described. The cap employed may be of the kind disclosed in my copending application above identified and my Patent No. 1,590,787, or of any other suitable sort. The lowermost cap is supported in a position such that it will be engaged by the mouth rim of the container incident to movement of same therebelow, the progressive movement of the container being effective to withdraw such cap from the chute, whereupon the cap comes to rest on the mouth of the container.

On the housing 11 are journaled sheaves 19, 19', 20 and 20' which rotate on vertical axes, the sheaves 19 and 19' being adjustable toward and from the sheaves 20 and 20' by suitable means such as the screws 21. Upon the sheaves 19 and 20 is entrained a belt 40 and upon the sheaves 19' and 20' a similar belt 40'. These belts are thin and flat, so that they present thin margins toward each other along the median line of the conveyor 14 and tunnel 11'. They are elastically compressible transversely, but substantially non-extensible longitudinally, and their relationship is such that the margins of the belts 40 and 40' travel very close to each other or in contact with each other under approximately the median line of the tunnel 11'.

The conveyor is suitably driven so as to convey the containers in the direction indicated by the arrow in Fig. 1, and the sheaves 20 and 20' are driven so as to move the inner traverses of the belts 40 and 40' in the corresponding direction and at the same speed as the conveyor. Said means for actuating the sheaves is shown in Fig. 3 and includes a shaft 77 which is driven by the conveyor operating means, and connected to the sheave 20, a cross shaft 78 driven from shaft 77 through the medium of bevel gears, and the hub shaft 79 connected to sheave 20' and driven from the cross shaft 78 through the medium of bevel gears.

The cross shaft 78 carries a wheel 22 about which is entrained the sealing belt 41, said belt at its forward end traveling over an idler wheel 28. A shoe 70 presses upon the lower traverse of belt 41, which travels over the conveyor 14 and in the corresponding direction and at like speed.

In operation of the apparatus, the tunnel 11' is kept filled with hot steam which is admitted continuously through the pipe 13. The containers, suitably filled with the material to be packaged and with their mouths open, are set upon the conveyor 14 and by it are carried into contact with the belts 40 and 40', which engage the necks of the containers at opposite sides and support them firmly in upright position during their ensuing progressive movement. The containers are thus moved progressively with their mouths traveling in the tunnel 11', wherein they are enveloped by hot vapor which exercises a sterilizing effect on them and displaces air from the head space. As each container reaches the lower end of the cap-supporting chute 51, it engages the lowermost cap therein, which is held in a sloping position in the path of the container mouth, and withdraws the cap from the chute, the cap thereupon coming to rest on and being carried forward with the container. The container then passes under the traveling sealing belt 41 which is pressed down upon the cap by the shoe 70 and forces the cap to sealed position on the container, as the container continues its progressive movement, the conveyor finally carrying it beyond the sealing belt and the belts 40 and 40' and out from under the housing 11 at the outlet of the machine.

From the foregoing it will be appreciated that the belts 40 and 40' afford the containers firm support, at their upper portions, so that they will not be upset by the resistance encountered in withdrawing the caps from the cap chute. Consequently, they may be passed through the machine very rapidly and in close succession. It will be also observed that the belts 40 and 40' function as a bottom closure for the tunnel 11 to prevent immediate escape of the hot vapor supplied to the tunnel by the pipe 13.

What I claim is:

1. In package sealing apparatus, in combination, a closure-supporting means adapted to retentively support a closure, means for supporting a packing container during movement of same past said closure-supporting means, elastically deformable belts arranged to travel in contact with each other along a portion of the container's path and adapted to grasp the container between them, and means for transmitting said holding members past the closure-supporting means in the direction of the movement of the container.

2. In package sealing apparatus, in combination, a housing affording a longitudinal tunnel adapted to accommodate a portion of a packing container, closure-supporting means in said housing, means for introducing hot fluid into said housing, and elastically deformable belts arranged to travel along said tunnel and in contact with each other to form a closure therefor.

3. In package sealing apparatus, in combination, a housing affording a downwardly opening longitudinal tunnel adapted to accommodate a portion of a packing container, closure-supporting means in said housing, means for introducing fluid into said housing, means below said tunnel for supporting packing containers for travel longitudinally thereof, elastically deformable belts arranged to travel along said tunnel and span the same to form a bottom closure therefor, and means for transmitting said belts.

4. In package sealing apparatus, in combination, a housing, a conveyor operable below the housing to move packing containers progressively with their mouths in the housing, means for introducing fluid into the housing, traveling members movable along opposite sides of the path of the containers and having portions arranged to form a bottom closure for the housing between the containers, and means for driving the conveyor and traveling members at the same linear speed.

5. Package sealing apparatus as specified in claim 4 and wherein said traveling members are belts which are elastically compressible transversely.

6. In packaging apparatus, in combination, a conveyor adapted to support packing vessels and to move them progressively, a housing over the conveyor and affording a tunnel extending longitudinally thereof in which the upper portions of the packing vessels may travel, and belts having portions extending in close collateral association with each other above the conveyor and below the top of the tunnel, said belts being adapted to grasp between them the upper portions of the packing vessels, means for introducing hot vapor into the tunnel above the belts, and means for transmitting the conveyor and belts in parallel directions longitudinally of the housing and at the same linear speed.

7. In package sealing apparatus, a combination as specified in claim 6 and including cap-supporting means arranged to support closure caps in the housing in the path of the mouth portions of the packing vessels.

8. In package sealing apparatus, a combination as specified in claim 6 and wherein said belts present narrow margins for engagement with the packing vessels and are elastically compressible transversely.

9. In package sealing apparatus, a combination as specified in claim 6 and including means for applying and sealing closure caps on the packing vessels while the latter are engaged by said belts.

10. In package sealing apparatus, in combination, a conveyor adapted to support packing vessels and to move them progressively, a housing over the conveyor and affording a tunnel extending longitudinally thereof in which the upper portions of a packing vessel may travel, rotatable sheaves carried by the housing, belts carried on said sheaves and extending collaterally of each other longitudinally of and above the conveyor and below the top of the tunnel and adapted to grasp between them the upper portions of packing vessels on the conveyor, means for adjusting the housing to vary the vertical spacing of said belts relative to the conveyor, and means for transmitting the conveyor and belts in parallel directions and at the same linear speed.

WILLIAM P. WHITE.